United States Patent
Bozzetto

(10) Patent No.: US 7,967,432 B2
(45) Date of Patent: Jun. 28, 2011

(54) ARM FOR SPECTACLES

(75) Inventor: Valter Bozzetto, S. Lucia di Piave (IT)

(73) Assignee: Novation Tech S.p.A., Montebelluna (TV) (IT)

( * ) Notice: Subject to any disclaimer, the term of this patent is extended or adjusted under 35 U.S.C. 154(b) by 0 days.

(21) Appl. No.: 12/809,201

(22) PCT Filed: Dec. 1, 2008

(86) PCT No.: PCT/EP2008/066497
§ 371 (c)(1),
(2), (4) Date: Jun. 18, 2010

(87) PCT Pub. No.: WO2009/080444
PCT Pub. Date: Jul. 2, 2009

(65) Prior Publication Data
US 2010/0309424 A1    Dec. 9, 2010

(30) Foreign Application Priority Data
Dec. 21, 2007    (IT) .............................. PD2007A0425

(51) Int. Cl.
*G02C 5/18* (2006.01)
(52) U.S. Cl. ........................................ 351/117; 351/111
(58) Field of Classification Search ................... 351/117, 351/111, 118, 119, 121, 123, 41, 156, 157, 351/158
See application file for complete search history.

(56) References Cited

U.S. PATENT DOCUMENTS

| 2,985,556 | A |   | 5/1961 | Rowland |
| 4,666,265 | A |   | 5/1987 | Takeda |
| 5,304,421 | A | * | 4/1994 | Lamy et al. .................. 428/377 |
| 5,482,664 | A |   | 1/1996 | Lamy |
| 5,786,881 | A |   | 7/1998 | Monroe |

FOREIGN PATENT DOCUMENTS

| EP | 0332540 A | 9/1989 |
| FR | 1399533 A | 5/1965 |
| GB | 626350 A | 7/1949 |
| JP | 60095422 A | 5/1985 |

OTHER PUBLICATIONS

ISR and Written Opinion in related PCT application PCT/EP2008/066497.
IPRP in related PCT application PCT/EP2008/066497.

* cited by examiner

*Primary Examiner* — Hung X Dang
(74) *Attorney, Agent, or Firm* — Kristina Castellano; Castellano PLLC

(57) ABSTRACT

A arm for spectacles (1, 50) comprises a first portion (11) made of polymer-based composite material reinforced with fibres and at least one film (23, 24) of thermoplastic polymeric material coupled to the first portion (11) as a covering for same.

26 Claims, 2 Drawing Sheets

ARM FOR SPECTACLES

CLAIM FOR PRIORITY

This application is a U.S. National Stage Application of PCT/EP2008/066497 filed on Dec.1, 2008, claiming priority to Italian application PD2007A000425 filed Dec.21, 2007, the contents of both of which are incorporated herein by reference.

TECHNICAL FIELD OF THE INVENTION

The invention concerns an arm for spectacles. It also relates to methods for the production of arms for spectacles.

TECHNOLOGICAL BACKGROUND

In the relevant technical field of the present invention, arms for spectacles are known which are made of thermoplastic or thermosetting polymeric material. In the continued search for new solutions, both functional and aesthetic, a requirement has arisen in this field for making spectacle arms of composite material comprising a polymeric matrix in which reinforcing fibres are embedded.

In particular there is a requirement for producing arms for spectacles in composite material where the reinforcing fibres are of the long fibre type and are present in a high proportion, in a percentage of at least 50% and up to 70% by weight.

This type of material, in itself, exhibits optimum mechanical characteristics and an aesthetic appearance which renders its use in the production of spectacle arms particularly attractive. However, it is decidedly lacking from the point of view of the flexing capacity, easily resulting in breakages when subjected even to limited flexing movements.

It is required, however, that spectacle arms should exhibit optimum flexibility characteristics both in order to adapt to the best possible extent to the various shapes of the heads of the users, and in order to withstand, without breaking into pieces, the stresses and/or impacts to which a pair of spectacles may be subjected during normal use. In order to increase the resilience of the known arms it is furthermore known to provide suitable resilient return devices, which act on the articulation between the arm and the front frame of the spectacles, and which allow the arms to be resiliently deflected with respect to a predefined open position. Of course, the provision of devices of the type indicated above has a significant effect on the production costs.

A further drawback connected with the use of composite material lies in the fact that it is chemically poorly compatible with the common thermoplastic and elastomeric polymeric materials used in the field, so that it would be difficult, for example, to overmould an element made of polyolefin or polyamide material onto a arm made of composite material, because of the lack of adhesion between the two materials.

A further drawback connected with the use of composite materials lies in the possibility of producing splinters and having sharp edges in the event of breakage.

DESCRIPTION OF THE INVENTION

The problem underlying the present invention is that of producing a spectacle arm structurally and functionally designed to remedy the limitations mentioned above with reference to the prior art cited.

Within the scope of this problem it is an aim of the invention to produce a spectacle arm made of composite material having a pleasing aesthetic appearance and good mechanical characteristics and, in particular, exhibiting good flexibility.

A further aim is that of improving the methods of production of arms for spectacles and containing the costs.

This problem is solved and these aims are achieved by the present invention by means of an arm for spectacles and methods for its production.

In particular, in a first aspect thereof, the invention concerns a spectacle arm comprising a first portion made of composite material onto which is coupled a film of thermoplastic polymeric material, as a covering for the first portion.

In a second aspect thereof, the invention concerns a method for producing spectacle arms made of composite material onto which is coupled a thermoplastic polymeric film.

The spectacle arms according to the invention are provided with optimum surface characteristics, have a pleasing aesthetic appearance, and at the same time are provided with optimum mechanical characteristics.

In particular, although they consist substantially of composite material, the arms according to the invention are surprisingly very flexible and have good resilient properties, without incurring unwanted breakages. This advantageous characteristic is obtained by the provision of the polymeric film as a covering for the portion made of composite material.

It was found that the arms thus obtained easily adapt to the shape of the head of the user, imparting to the spectacles optimum wearability and stability in use.

Spectacles provided with arms according to the invention may therefore be used advantageously for sporting or competitive activities, the risk of the user losing the spectacles being particularly reduced. Moreover, since the arms according to the invention are provided with a good resilient return, spectacles provided with such arms maintain their original shape almost unaltered over time.

This makes it possible to obtain spectacles which maintain optimum characteristics of wearability over time, and which therefore do not require particular maintenance operations.

Advantageously, the presence of the polymeric film makes it possible to apply to the arms according to the invention thermoplastic or elastomeric to material which adheres well to the polymeric film, in order to create desired aesthetic patterns, optionally in relief, for example the logos of the production company, or in order to produce specific elements of the arm such as, for example, the end section of the arm or an element for supporting same on the head of the users.

This makes it possible to obtain spectacles having a refined aesthetic appearance, easily distinguishable and particularly pleasing to the user.

The composite materials used in the arm comprise a polymeric matrix and percentages by weight equal to or greater than around 50% of fibres, the fibres being of the continuous type, unidirectional and in mat form.

These composite materials are very different, both from the production point of view and that of the mechanical characteristics, from the composite materials comprising a polymeric matrix in which are embedded, up to a maximum of 40% by weight, reinforcing fibres of reduced length (known as "short fibres"), generally dispersed in the matrix in random order.

Preferably, the composite material used in the arms of the invention comprises a percentage by weight of fibres of between around 50% and around 70%, impregnated in a polymeric matrix which may be of the thermosetting type, for example based on epoxides or polyester, or of the thermoplastic type, for example based on polyethylene, polypropylene, polyvinyl chloride, and other polyolefins, optionally substituted, of polyamides, polyesters, polyurethanes, or of copolymers, such as for example ABS.

Inorganic fibres, such as, for example, glass fibres, carbon fibres or mineral fibres, organic fibres or aramide fibres may be used as reinforcing fibres.

In particular, the use of composite materials with an epoxide-based matrix reinforced with carbon fibres is preferred.

The composite material used in the present invention is generally composed of layers superposed on one another and, preferably, the first portion comprises a plurality of between 2 and 5 superposed layers.

In general, the fibres present in the composite material may be processed so as to be substantially unidirectional, or so as to be braided, or woven, i.e. disposed in a warp and weft arrangement.

For spectacle arms having a limited height, i.e. a height of less than around 4 mm, it is preferable to use substantially unidirectional fibres, extending parallel to the predominant longitudinal direction of the arm.

Such an expedient makes it possible to improve further the flexing capacity of arms having a limited height and to reduce their fragility significantly.

For spectacle arms having instead a height greater than 4 mm, braided or woven fibres may be used.

It is pointed out that by the height of the arm there is meant the dimension of the latter which is transverse to the predominant longitudinal direction of the arm and substantially parallel to the head of the user when the spectacles are being worn.

As the material for the production of the thermoplastic polymeric film, within the scope of the invention various types of materials may be used; the type of polymeric material effectively used is selected from the materials chemically most compatible with the composite material used.

Preferably, the polymeric material is selected from a group of polymeric mixtures comprising the mixtures based on polyamides, polyesters, polyolefins, substituted polyolefins, polyurethanes, or based on copolymers such as ABS.

Preferably, the arm has a plate-like configuration defining two opposed principal surfaces and provision is made for both principal surfaces to be covered by a respective thermoplastic polymeric film.

This makes it possible to obtain spectacle arms having a more balanced structure and a great stability, and which may be more easily controlled in their production stage.

In a preferred embodiment, the first portion made of composite material comprises a finishing layer of metallised composite material disposed directly in contact with the film, which is itself transparent. In this way, the finishing layer becomes directly visible through the film, imparting a particular aesthetic quality to the arm, while at the same time maintaining the flexing capacity, the resilience and the possibility of overmoulding a thermoplastic or elastomeric material.

In an alternative embodiment, the finishing layer of metallised composite material is coupled onto the film on the opposite side from the first portion, so as to become the outermost layer of the arm, while the film is interposed between the first portion and the finishing layer. The adoption of this structure makes it possible to obtain important advantages at the level of production of the arm, as described in more detail below.

Preferably, the method of production of the arm provides for the arms to be obtained by cutting from a plate, formed of the composite material constituting the first portion covered by the thermoplastic polymeric film.

The plate is itself formed by the superposition of several layers of a material which is a precursor of the composite material, formed by the reinforcing fibres impregnated in a polymeric matrix which is not yet crosslinked or completely polymerised, to which the polymeric film is applied, preferably on both the principal surfaces.

As stated above, the finishing layer of metallised composite material may be arranged as the outermost layer of the first portion, in a position immediately underlying the polymeric film, or may be arranged above the film, on the opposite side from the first portion.

The Applicant has noted that in this latter case the cutting of the plate in order to obtain the arms results in an optimum quality, precise and without burrs, whereas in the first configuration refinishing treatment of the edges is rendered necessary.

In the embodiment with the finishing layer outside the film, it is preferred to apply a layer of varnish to the finishing layer, so as to improve the quality of its surface finish.

The invention will be more easily understood and implemented with reference to the description of the appended drawings which illustrate some exemplary embodiments thereof provided by way of non-limiting example, in which.

Figure 1:
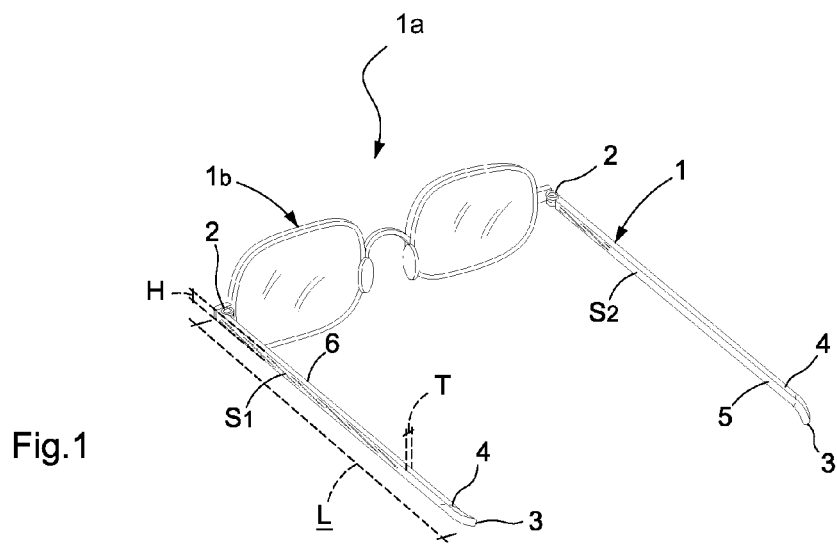
FIG. 1 is a diagrammatic view of a pair of spectacles comprising a arm according to a first exemplary embodiment of the invention.
Figure 3:
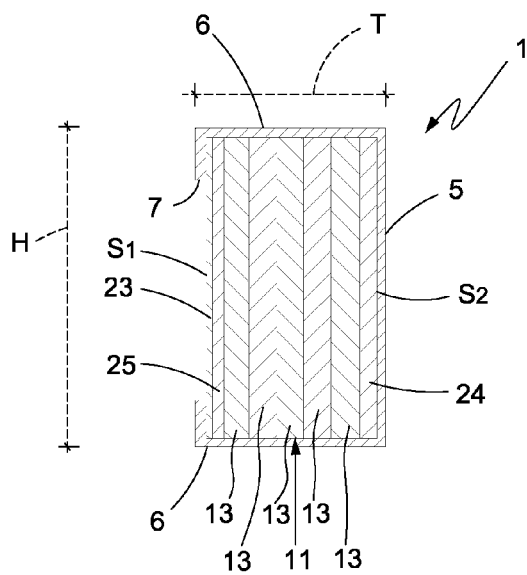
FIG. 3 is a cross-sectional view on an enlarged scale of the arm of FIG. 2 along the line III-III.

With reference to the appended drawings, the reference 1 indicates as a whole a arm suitable for being used to produce a generic pair of spectacles 1a, indicated only diagrammatically in FIG. 1. The spectacles 1a may be vision spectacles, sunglasses, spectacles for sporting activity, skiing, etc.

The arm 1 is preferably plate-like, having defined thereon opposed principal surfaces S1 and S2, the first surface 51 being intended to be visible when the spectacles are being worn.

The arm 1 extends in a predominant longitudinal direction and on it can be identified a length L, a height H, considered in the direction transverse to the length L, and substantially parallel to the head of the user when wearing the spectacles, and also a thickness T.

The value of the length L of the arm may be suitably varied in order to obtain spectacles of different types, for example spectacles for children, having arms with a limited length L, and spectacles for adults having arms with a greater length L.

The arm 1 may further be shaped in such a way as to have various different values for the height H, depending on the use of the spectacles and on the specific design selected. In particular, arms known as reduced height arms may be produced, having values for height H of less than around 4 mm, and arms known as raised height arms, having higher values for height H.

The arm 1 comprises a first end 2 suitable for being connected, via suitable connecting means, to a front frame 1b of the spectacles 1a and a second end 3, opposed to the end 2, and intended to be slipped onto the ear of a user, or in any case in contact with the user's head.

The second end 3 may comprise a curved zone 4 suitably shaped so as to facilitate the slipping on of the spectacles provided with the arm 1 and to improve the wearability thereof on a specific user. An end section or a support element may be provided on the end 3.

The arm 1 comprises a first portion 11 made of polymer-based composite material reinforced with fibres and onto which are coupled, at the opposed surfaces S1 and S2, respectively a first and a second film 23, 24, made of thermoplastic polymeric material.

The first portion 11 substantially forms the core of the arm 1 and preferably extends over its entire length in order to impart to it the characteristics of mechanical strength and lightness.

Preferably, the first portion 11 comprises a plurality of layers 13 of composite material, comprising a matrix based on epoxide resin reinforced with long carbon fibres in a proportion of between 50% and 70% by weight. The number of superposed layers 13 is variable according to the configuration and the characteristics required of the arm 1, and is preferably between 2 and 5.

The first portion 11 further comprises a finishing layer 25, outside the layers 13 and facing towards the principal surface S1, so as to be in a position immediately underlying the film 23.

The films 23, 24 preferably entirely cover the first portion 11 and are optically transparent. In this way, through the film 23 there can still be seen the finishing layer 25, which is therefore preferably made of metallised composite material, so as to impart to the arm 1a particular aesthetic quality. In the example described herein, the finishing layer is provided only at the film 23 and at the principal surface 51, in view when the spectacles are being worn, although it is possible to provide one also in a position directly in contact with the film 24, at the principal surface S2.

Preferably, the arm 1 further comprises a covering 5, made of thermoplastic or elastomeric material, for example polyurethane-based, and is preferably overmoulded on the polymeric films 23, 24 so as to cover the end portion of the arm 1, at the end 3 and in particular along the edges 6 of the arm, delimiting the principal surfaces 51, S2.

On the covering 5 there is conveniently open, at least at the principal surface 51, a window 7 through which the film 23 and the first portion 11 can clearly be seen.

In addition, or as an alternative, provision is made for the arm 1 to comprise other elements made of thermoplastic or elastomeric material which are moulded on the films 23 and/or 24, such as logos, decorative patterns, or an end element of the arm.

The provision of the first and the second film 23, 24 on opposite sides of the first portion 11 renders the structure of the arm 1 substantially symmetrical and balanced, with a high dimensional stability, which proves particularly important in the production stage of the arm, as explained hereinafter.

Figure 4:
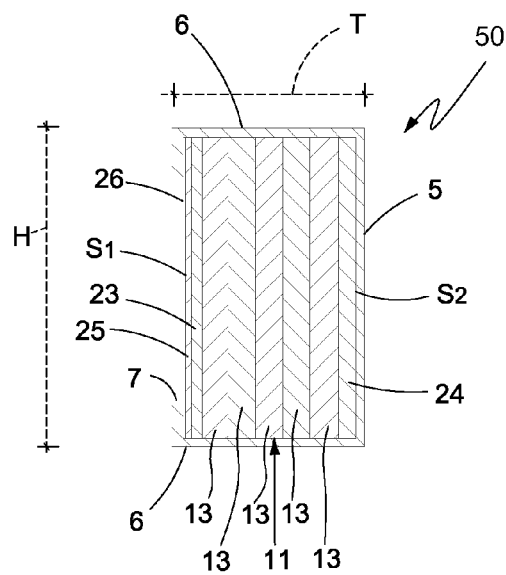
FIG. 4 is a view analogous to FIG. 3 of a arm representing a second exemplary embodiment of the invention.
Figure 2:
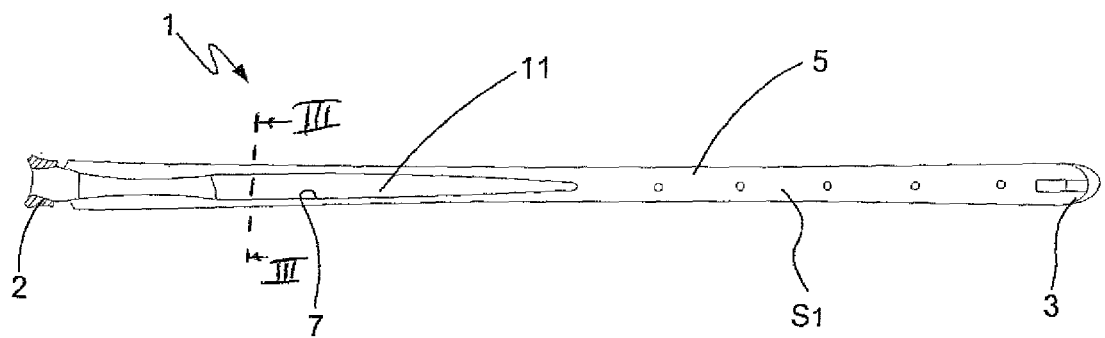
FIG. 2 is a view on an enlarged scale of the arm of FIG. 1.

With reference to FIG. 4, a arm 50 is shown, representing a second exemplary embodiment in which corresponding elements are indicated by the same reference numbers as in the preceding example.

The arm 50 differs from the arm 1 in that the finishing layer 25 made of metallised composite material is coupled onto the first film 23 and/or on the second film 24, on the opposite side from the first portion 11, such that the film is interposed between the first portion 11 and the finishing layer 25.

Preferably, on the finishing layer 25, on the opposite side from the film 23, 24, a layer of varnish 26 is subsequently applied which is useful for correcting any surface defects present on the finishing layer 25, further improving the aesthetic appearance of the arm 1.

Figure 5:
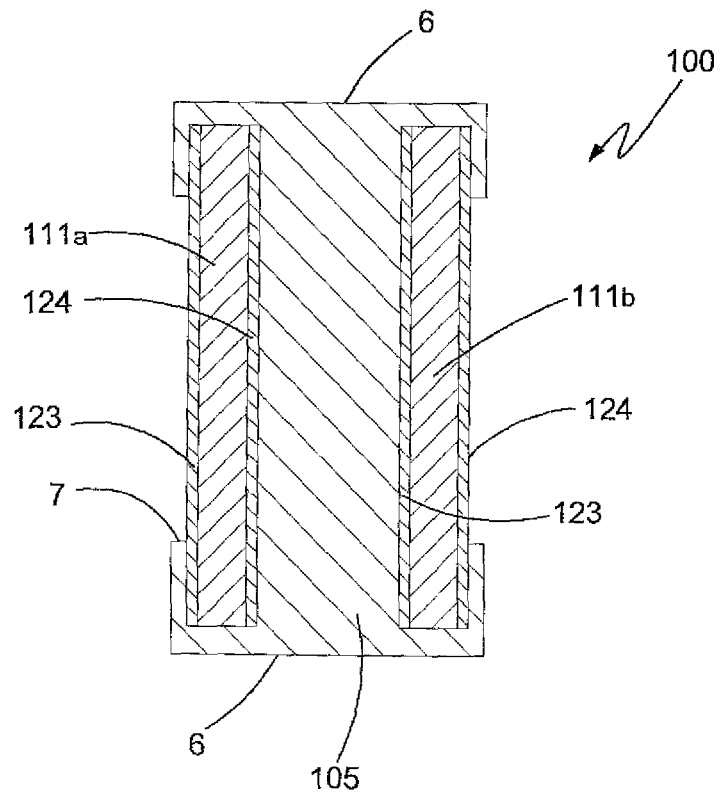
FIG. 5 is a view analogous to FIG. 3 of a arm representing a third exemplary embodiment of the invention.

With reference to FIG. 5, a arm 100 is shown, representing a third exemplary embodiment in which corresponding elements are indicated by the same reference numbers as in the preceding examples.

The arm 100 differs from the arms of the preceding examples in that the first portion 11 is divided into two sub-portions 111a and 111b, arranged within the arm 100 separately and symmetrically, and each of which is coupled at the respective principal surfaces onto thermoplastic polymeric films 123, 124. The two sub-portions 111a and 111b are connected and held coupled to each other by a covering 105 of thermoplastic or elastomeric material, for example polyurethane-based, which is interposed between the two sub-portions as well as on the edges 6 of the arm. In each case, in the covering 105 the opening of one or more windows is provided through which the composite material of at least one of the sub-portions 111a, 111b is visible from the outside of the arm 100.

The spectacle arms 1, 50 and 100 according to the invention are obtained by cutting from a plate, according to a predetermined configuration.

The plate is obtained by the superposition of several layers 13 of material to which is a precursor of the composite material, intended to form the first portion 11 of the arm 1, 50, or a sub-portion 111 of the arm 100.

The precursors of the composite material, known as pre-impregnates or "prepregs" are known per se and are substantially formed by a substrate of fibres (woven or "mat") which is impregnated with the base components of a non-crosslinked thermosetting polymer, or with a polymer in the incompletely polymerised state.

For the production of the arm 1, there may then be applied to the layers 13, also on only one side, a finishing layer 25 of a material which is a precursor of the metallised composite and then, on both the principal surfaces, the thermoplastic polymeric films 23, 24.

On the other hand, the method of production of the arm 50 provides for the application of the finishing layer 25 to take place after the films 23, 24 have been applied to the layers 13.

In either case, the plate is then subjected to a suitable treatment in order to transform the precursor material into the composite material of interest.

In the preferred case of composite material having an epoxide-based matrix, provision is made for the plate to be introduced into a mould and subjected to a temperature and pressure such as to induce the crosslinking of the matrix itself. The plate is then extracted from the crosslinking mould and cut in such a way as to obtain a plurality of arms 1, 50. Cutting may be carried out with water or with a milling machine, or also by means of cutting with a laser.

It was noted that the provision of films on both the principal surfaces, and the consequent structural symmetry, made it possible to eliminate any to deformations to which the plate was subjected as a result of the crosslinking treatment in the mould, with improved control of the product.

It was further observed that in the case of a plate in which the finishing layer 25 is applied to the film 23, 24 on the opposite side from the layers 13 (arm 50), cutting is of optimum quality and accuracy, substantially devoid of burrs.

In addition, the layer of varnish 26 is preferably applied to the finishing layer 25.

In the case where the films 23, 24 are instead in an outside position (arm 1), it is preferable to trim the arms in order to eliminate the burrs formed during the cutting operations.

In this second case, however, it proves particularly convenient to apply to the arms obtained by cutting, if desired, thermoplastic or elastomeric material, for example by means of injection-moulding, or by casting, in order to produce decorative patterns, a support element for the arm, etc. The adhesion between thermoplastic or elastomeric material and the polymeric film 23 or 24 in fact proves to be particularly sound. Moreover, the surface quality of the films 23, 24 is normally optimum, such that the varnishing operation may be omitted.

In an alternative embodiment, not shown in the appended drawings, provision is made for a finishing layer to be in part applied beneath the polymeric film, on the same side as the layers 13, as in the arm 1, and in part on top of the film itself, on the opposite side from the layers 13, as in the arm 50.

The method of production of the arm 100 provides for the formation of the sub-portions 111*a* and 111*b* by cutting from a plate, similarly to the first portions 11 of the arms 1, 50, after the sub-portions are suitably positioned in a mould into which the thermoplastic or elastomeric material forming the covering 105 is preferably injected.

The present invention therefore solves the problem disclosed above and achieves the set aims, providing numerous other advantages at the same time.

A first advantage lies in the fact that owing to the distinct characteristics of resilience provided by the arm produced according to the invention, it is not necessary to have recourse to resilient return devices to be interposed between the arm and the front frame.

A further advantage lies in the fact that the presence of the polymeric film makes it possible, in the unfortunate event of breakage of the arm, to retain the splinters of composite material which might form and to mask, at least partially, the sharp edges.

A further advantage lies in the fact that the arms obtained according to the present invention, besides the optimum properties of mechanical strength, resilience and flexibility, also have a particularly low weight.

The invention claimed is:

1. An arm for spectacles comprising
    a first portion comprising polymer-based composite material reinforced with fibres, said fibres being embedded in a thermosetting polymeric material, and
    at least one film of thermoplastic polymeric material, wherein said at least one film of thermoplastic polymeric material is coupled to said first portion as a covering for said first portion.

2. The arm according to claim 1, wherein said first portion comprises a plurality of superposed layers comprising said composite material.

3. The arm according to claim 2, wherein said first portion comprises a number, between 2 and 5, of superposed layers comprising said composite material.

4. The arm according to claim 1, wherein said first portion comprises opposed principal surfaces, and wherein films of said thermoplastic polymeric material are coupled to and cover at least a portion of said opposed principal surfaces of said first portion.

5. The arm according to claim 1, wherein said at least one film of thermoplastic polymeric material is substantially transparent and said first portion comprises a finishing layer comprising composite material, wherein said finishing layer is directly coupled to said at least one film of thermoplastic polymeric material, such that said finishing layer is visible from outside of said arm through said at least one film of thermoplastic material.

6. The arm according to claim 5, wherein said finishing layer comprises metallised composite material.

7. The arm according to claim 1, wherein a finishing layer of composite material is applied to at least a part of a surface of said at least one film of thermoplastic polymeric material opposed to said first portion.

8. The arm according to claim 7, wherein a layer of varnish is applied to said finishing layer on the opposite side of said finishing layer from said film.

9. The arm according to claim 1, wherein an element comprising thermoplastic or elastomeric material is coupled onto at least a part of a surface of said film of thermoplastic polymeric material opposed to said first portion.

10. The arm according to claim 9, wherein said element comprising thermoplastic or elastomeric material is a covering for said arm, onto which at least one window opens in order to render said composite material visible.

11. The arm according to claim 10, wherein said covering covers edges of said arm which delimit principal surfaces.

12. The arm according to claim 9, wherein said first portion comprises at least two separate sub-portions and said element comprising thermoplastic material extends between said sub-portions to connect and hold said sub-portions coupled to each other.

13. The arm according to claim 1, wherein said thermosetting polymeric material comprises epoxide-based resin.

14. The arm according to claim 1, wherein said composite material comprises a percentage by weight of reinforcing fibres equal to or greater than around 50%.

15. The arm according to claim 14, wherein said fibres are of a continuous unidirectional type, or in mat form.

16. The arm according to claim 1, wherein said fibres comprise carbon fibres.

17. The arm according to claim 1, wherein said arm has a height of less than around 4 mm and said composite material comprises fibres oriented in a substantially unidirectional manner, substantially parallel to a predominant longitudinal direction of said arm.

18. Spectacles comprising
    a front frame on which is articulated a pair of arms, wherein said arms comprise two arms according to claim 1.

19. A method for the production of arms for spectacles, comprising the steps of
    preparing a first portion of said arms comprising polymer-based composite material reinforced with fibres, said fibres being embedded in a thermosetting polymeric material, and
    coupling to said first portion as a covering for said first portion, at least one film of thermoplastic polymeric material.

20. The method according to claim 19, comprising
    preparing a plate comprising said first portion onto which plate is coupled said film of thermoplastic material, and
    cutting said plate to obtain a plurality of said arms for spectacles.

21. The method according to claim 20, wherein said preparing a plate provides for the preparation of a material which is a precursor of said composite material intended to form said first portion, and wherein the subsequent coupling of said film of thermoplastic material onto said precursor material and treatment of said plate facilitates the formation of the composite material of said first portion.

22. The method according to claim 20, wherein said film of thermoplastic material is coupled onto said first portion to cover both opposing principal surfaces of said plate.

23. The method according to claim 20, wherein before cutting said plate, said method further comprises applying a finishing layer of composite material on at least a surface part of said film, said surface part of said film being opposed to said first portion.

24. The method according to claim 23, wherein said finishing layer comprises metallised composite material.

25. The method according to claim 23, wherein said finishing layer is varnished.

26. The method according to claim 19, further comprising applying, by overmoulding, thermoplastic or elastomeric material to at least a part of a surface of said film of thermoplastic polymeric material, said surface being opposed to said first portion.

* * * * *